United States Patent
Sheedy et al.

(10) Patent No.: US 6,796,114 B2
(45) Date of Patent: Sep. 28, 2004

(54) ACCESS PLATE FOR AN AUGER TUBE

(75) Inventors: Ronald Leo Sheedy, Eldridge, IA (US); Duane Junior Gosa, Colona, IL (US); Randy William DeRudder, East Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/207,692

(22) Filed: Jul. 29, 2002

(65) Prior Publication Data

US 2004/0016218 A1 Jan. 29, 2004

(51) Int. Cl.$^7$ .............................................. A01D 89/00
(52) U.S. Cl. ....................................................... 56/364
(58) Field of Search .................. 56/12.6, 364; 198/613, 198/671, 860.4

(56) References Cited

U.S. PATENT DOCUMENTS

| | | | | |
|---|---|---|---|---|
| 1,631,038 A | * | 5/1927 | Hodny et al. ................ | 248/489 |
| 2,748,921 A | * | 6/1956 | White ......................... | 198/518 |
| 3,031,064 A | * | 4/1962 | Kline .......................... | 198/359 |
| 3,142,375 A | * | 7/1964 | Luke ........................... | 198/693 |
| 3,283,794 A | * | 11/1966 | Steward et al. ............. | 411/111 |
| 3,511,362 A | * | 5/1970 | Gaeddert et al. ............ | 198/693 |
| 4,106,272 A | * | 8/1978 | Peterson et al. .............. | 56/202 |
| 4,573,567 A | * | 3/1986 | Swinderman ............. | 198/860.4 |
| 4,705,160 A | * | 11/1987 | Grundken et al. ........ | 198/735.4 |
| 6,158,571 A | | 12/2000 | Gosa ........................... | 198/613 |

OTHER PUBLICATIONS

John Deere Parts Catalog Brochure "Cross Auger and Shaft", p. 25–9.
Gleaner Brochure "Gleaner Combine" p. 54.
Case IH Parts Catalog Brochure, p. 9–87A.
Claas Parts Catalog Brochure, p. 20.

* cited by examiner

Primary Examiner—Robert E. Pezzuto
Assistant Examiner—Alicia Torres

(57) ABSTRACT

The access plate comprises a curved oblong plate for covering an oblong access opening in a cylindrical auger tube. When the access plate is mounted to the auger tube, the concave inner surface of the access plate adjoins the cylindrical exterior surface of the auger tube. The access plate has a first side that is provided with an inwardly indented offset portion. The offset portion traps the cylindrical auger tube. The access plate has an opposed second side that is provided with a clamping plate that adjoins the inner surface of the access plate. The clamping plate has two clamping plate mounting holes each having a clip nut. The clamping plate mounting holes are aligned with two access plate mounting holes. Mounting bolts extend through the access plate mounting holes and engage the clip nuts on the clamping plate.

8 Claims, 2 Drawing Sheets

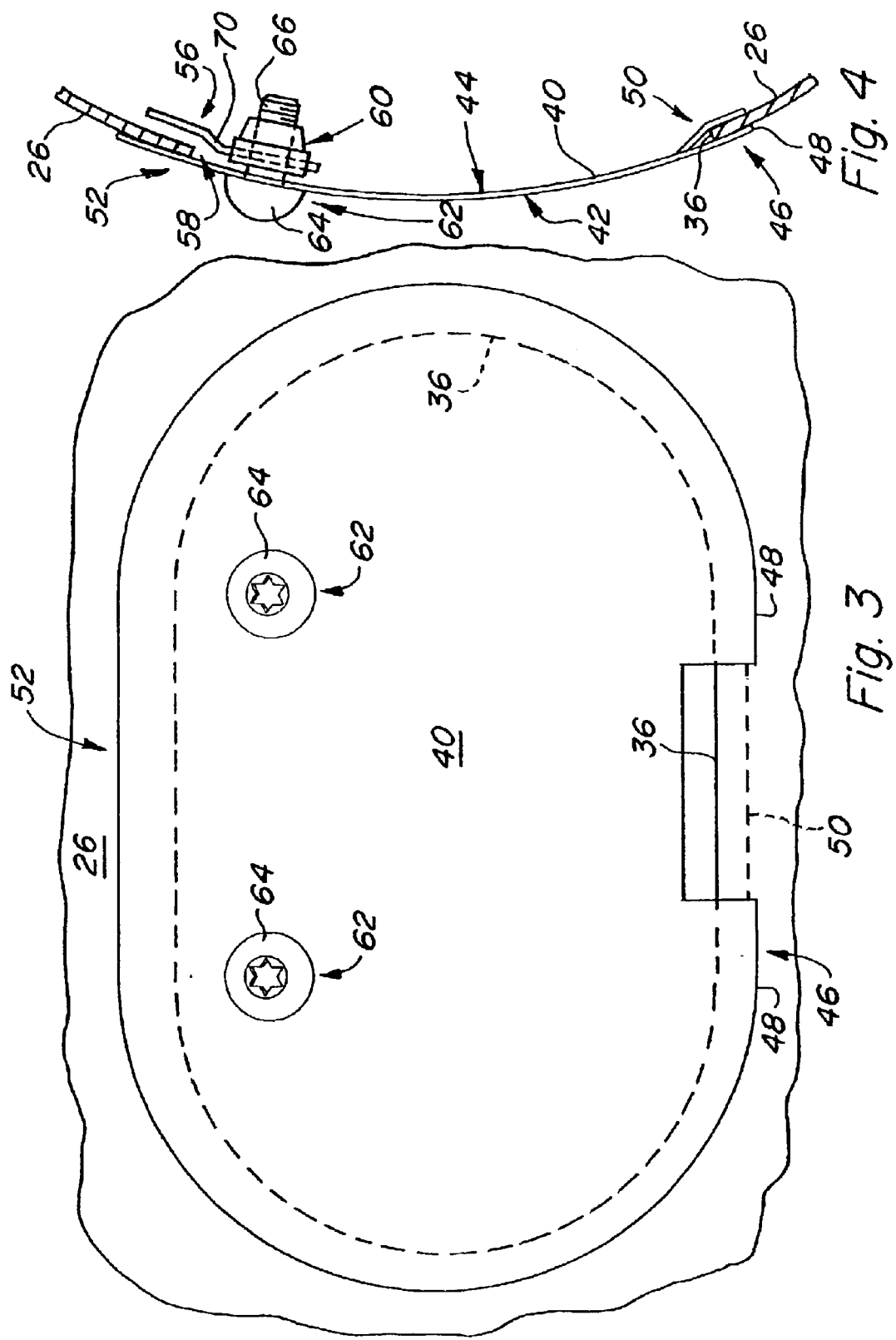

ACCESS PLATE FOR AN AUGER TUBE

FIELD OF THE INVENTION

The present invention is directed to an access plate for an auger tube of a harvesting platform having a clamping plate for clamping the access plate to the auger tube.

BACKGROUND OF THE INVENTION

Large transverse augers are used on harvesting platforms to centrally concentrate the harvested crop and direct the harvested crop to a feederhouse. The augers typically comprise a hollow cylindrical auger tube having helical flights. The transversely central portion of the auger tube is provided with a number of disappearing fingers that are arranged on an eccentric axle located inside the auger tube. These fingers are used to engage the harvested crop material and propel it rearwardly into a feederhouse. Sometimes the fingers break and need replacement or maintenance. As such, the cylindrical tube is provided with circular or oblong access openings defined by an access edge. These access openings are covered by removable access plates. Typically one side of an access plate has an inwardly indented offset portion for engaging the one side of the access opening edge. The other side of the access plate is provided with access plate mounting holes which align with auger tube mounting holes in the auger tube. Nuts may be welded to the interior surface of the auger tube adjacent to the auger tube mounting holes for receiving mounting bolts. The mounting bolts pass through the access plate mounting holes and the mounting holes on the cylindrical tube and engage the nuts for securing the access plate to the cylindrical tube.

It has been found that the cylindrical tube is weakened at the location of the auger tube mounting holes and under extreme conditions, cracks may form in the cylindrical tube extending from the mounting holes. If these cracks develop during harvesting operations, the operator will typically weld small patching plates to the cylindrical tube covering the cracks. The heat from these welds further weakens the auger tube.

SUMMARY OF THE INVENTION

It is an object of the present invention to provide an access plate for an auger tube that does not require auger tube mounting holes, but relies on a clamping plate.

The access plate comprises a curved oblong plate for covering an oblong access opening in a cylindrical auger tube. The outer surface of the plate is convex, whereas the inner surface of the access plate is concave. When the access plate is mounted to the auger tube, the concave inner surface adjoins the cylindrical exterior surface of the auger tube. As the access plate is larger than the access opening, the inner surface of the access plate bears against the exterior surface of the auger tube adjacent to the access opening edge.

The access plate has a first side. The first side has an edge and an offset portion that is indented inwardly from the edge. The offset portion traps the cylindrical auger tube between the offset portion and the inner surface of the access plate. The access plate has an opposed second side that is provided with a clamping plate that adjoins the inner surface of the access plate. The clamping plate has two clamping plate mounting holes. Each of the clamping plate mounting holes is provided with a clip nut. The clamping plate mounting holes are aligned with two access plate mounting holes. Mounting bolts extend through the access plate mounting holes and engage the clip nuts on the clamping plate. Each mounting bolt has a head portion that is larger than the access plate mounting holes and a threaded portion that is screwed into the respective clip nut. The clamping plate is also provided with a seating offset having an outer surface that engages the interior wall of the auger tube.

BRIEF DESCRIPTION OF THE DRAWINGS

FIG. 3 is a partial front view of the access plate and auger tube.

FIG. 4 is a cross sectional side view of the access plate and auger tube.

DETAILED DESCRIPTION

Figure 1:
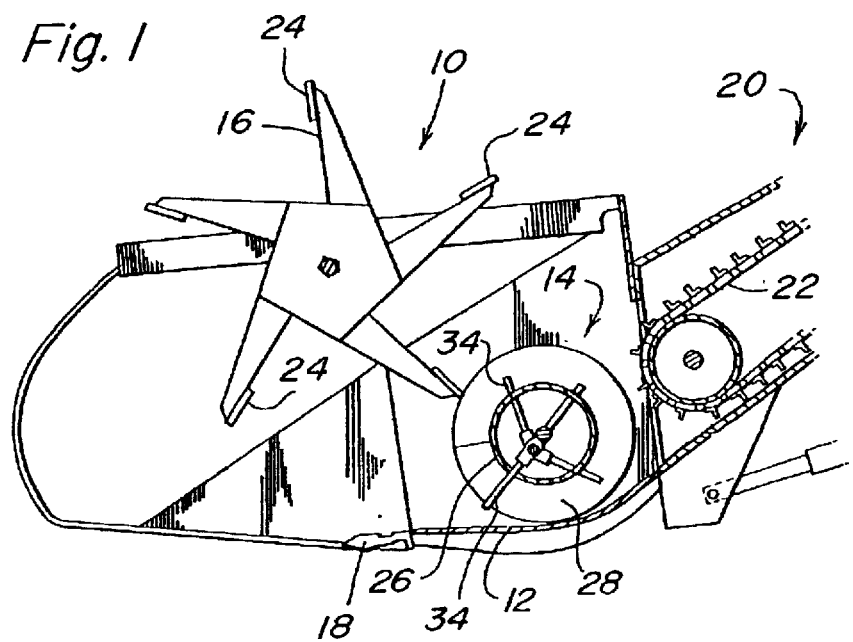
FIG. 1 is a cross sectional side view of a harvesting platform.
Figure 2:
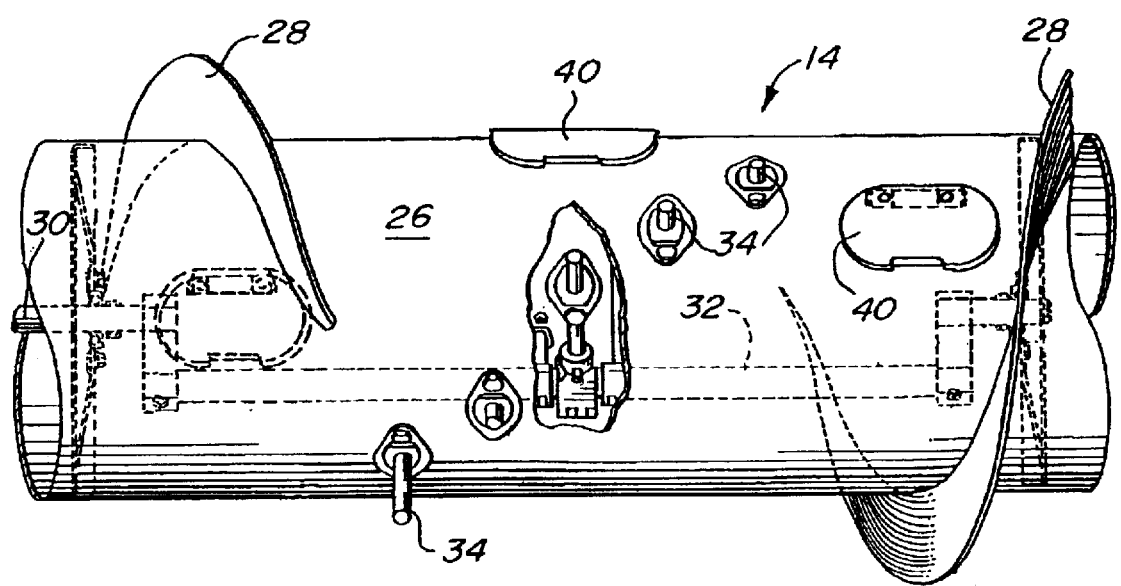
FIG. 2 is a front view of an auger tube.

The harvesting platform 10, illustrated in FIG. 1, comprises a frame 12, a transverse auger 14, a gathering reel 16 and a cutterbar 18. The harvesting platform 10 is mounted to a feederhouse 20 having an upwardly sloping chain conveyor 22. During a harvesting operation, the platform is propelled forwardly through a field by a combine, only the feederhouse 20 being shown. The gathering reel 16 is rotated slightly faster than the ground speed of the platform so that the transversely extending reel bats 24 pull the standing crop against the cutterbar 18. The cutterbar 18 cuts the crop and the gathering reel 16 directs the cut crop rearwardly to the transverse auger 14.

The auger 14 comprises a transversely extending hollow cylindrical tube 26. The hollow cylindrical tube 26 has an interior surface and an exterior surface. The transverse outer portions of the auger tube 26 are provided with helical flights 28. As the auger 14 is rotated, the helical flights 28 pull the cut crop inwardly to the transverse center of the harvesting platform 10. An axle 30 extends through the cylindrical auger tube 26. The transverse central portion 32 of the axle 30 located in the transverse central portion of the auger tube 26 is eccentrically arranged relative to the central transverse axis of the cylindrical auger tube 26. A series of radially extending fingers 34 extend outwardly from the central portion 32 of the axle through holes in the central portion of the cylindrical auger tube 26. These fingers 34 engage the concentrated cut crop and propel it rearwardly into feederhouse 20.

The fingers 34 sometimes must be replaced due to breakage. As such, access openings are formed in the cylindrical auger tube 26. The access openings are defined by an oblong access opening edge 36. These openings are closed by a removable oblong access plate 40 that is larger than the access openings. Access plate 40 comprises a curved plate having a convex outer surface 42 and a concave inner surface 44. The curvature of the curved plate corresponds to the curvature of the exterior surface of the cylindrical auger tube 26.

The access plate 40 has a first side 46 having a plate edge 48. An offset indented portion 50 extends inwardly from the plate edge 48. The offset indented portion 50 is used to trap a wall of the cylindrical auger tube 26 between the offset portion 50 and the concave inner surface 44 of the curved plate 40.

The access plate has a second side 52 that is opposite the first side 46. The inner surface 44 of the second side 52 is provided with a clamping plate 56. The clamping plate 56 has an outer side 58 that adjoins the inner surface 44 of the access plate. The clamping plate 56 is provided with two clamping plate mounting holes. Each of the clamping plate mounting holes is provided with a clip nut 60. The access plate 40 is provided with two access plate mounting holes that are aligned with the clamping plate mounting holes. Mounting bolts 62 have a head portion 64 and a threaded portion 66. The threaded portions 66 passes through the access plate mounting holes and the clamping plate mounting holes. The head portion 62 is larger than the access plate mounting holes and adjoins the outer surface 42 of the access plate 40. The threaded portion 66 is screwed into the clip nuts 60 and passes through the clamping plate mounting holes.

The clamping plate 56 has a seating offset 70 for centering the access plate 40 on the access opening.

In mounting the access plate 40 to the access opening, the mounting bolts 62 are loosened so that the gap between the clamping plate 56 and the inner surface 44 of the access plate 40 is expanded, as shown in FIG. 4. The second side 52 of the access plate 40 is then inserted into the access opening, so that the wall of the auger tube 26 is located between the clamping plate 56 and the access plate 40. The access plate 40 is inserted so that the edge 36 of the access opening bears against the mounting bolt 62. The access plate 40 is then pivoted along the axis defined by the engaged edge 36 until the indented portion 50 can be used to trap the wall of the auger tube 26 opposite from the engaged edge 36. The mounting bolts 62 are then tightened so that the seating offset 70 centers the access plate 40 on the access opening.

Having described the preferred embodiment, it will become apparent that various modifications can be made without departing from the scope of the invention as defined in the accompanying claims.

What is claimed is:

1. An access plate for a hollow cylindrical auger tube, the access plate comprising:
    a curved plate having a convex outer surface and a concave inner surface, the curved plate being provided with a first side and a second side opposed from the first side, the first side having a first edge, the first side having an offset portion that is indented inwardly from the first edge trapping a wall of the auger tube between the offset portion and the concave inner surface of the curved plate;
    a clamping plate is mounted to the second side of the curved plate adjoining the concave inner surface of the curved plate and is secured thereto by a fastener that draws the clamping plate towards the curved plate to clamp the plate to the auger tube, the fastener comprises a mounting bolt passing through the curved plate, the mounting bolt having a threaded portion that extends into the clamping plate and a head portion that adjoins the convex outer surface of the curved plate, the clamping plate is provided with a clip nut into which the threaded portion of the mounting bolt is screwed, the clamping plate is also provided with a seating offset having an outer surface which engages the wall of the auger tube when the access plate is clamped thereto.

2. An access plate as defined by claim 1 wherein two mounting bolts secure the curved plate to an auger tube and two clip nuts are located on the clamping plate for receiving the two mounting bolts.

3. An access plate as defined by claim 2 wherein the access plate is oblong.

4. An auger tube for an agricultural harvesting machine, the auger tube comprising:
    a hollow cylindrical tube having a wall onto which is mounted helical flights, an access opening is formed in the wall, the access opening being defined by an opening edge;
    an access plate comprising a curved plate having a convex outer surface and a concave inner surface, the curved plate being provided with a first side and a second side opposed from the first side, the first side having an edge, the first side having an offset portion that is indented inwardly from the edge trapping the wall of the auger tube between the offset portion and the concave inner surface of the curved plate and a clamping plate is mounted to the second side of the curved plate adjoining the concave inner surface of the curved plate and is secured thereto by a fastener for drawing the clamping plate towards the curved plate to clamp the plate to the wall of the auger tube, the fastener comprises a mounting bolt passing through the curved plate, the mounting bolt having a threaded portion that extends into the clamping plate and a head portion that adjoins the convex outer surface of the curved plate, the clamping plate is provided with a clip nut into which the threaded portion of the mounting bolt is screwed, the clamping plate is also provided with a seating offset having an outer surface which engages the wall of the auger tube when the access plate is clamped thereto.

5. An auger tube as defined by claim 4 wherein two mounting bolts secure the curved plate to the auger tube and two clip nuts are located on the clamping plate for receiving the two mounting bolts.

6. An auger tube as defined by claim 5 wherein the access plate and the access opening are oblong.

7. A harvesting platform for harvesting an agricultural crop, the harvesting platform comprising:
    a frame,
    an auger tube rotatively mounted on the frame, the auger tube being a hollow cylindrical tube having a wall that is provided with helical flights, an access opening is formed in the cylindrical wall, the access opening being defined by an opening edge;
    an access plate comprising a curved plate having a convex outer surface and
    a concave inner surface, the curved plate being provided with a first side and a second side opposed from the first side, the first side having an edge, the first side having an offset portion that is indented inwardly from the edge trapping the wall of the auger tube between the offset portion and the concave inner surface of the curved plate and a clamping plate is mounted to the second side of the curved plate adjoining the convex inner surface, the curved plate is secured to the access opening by a fastener for drawing the clamping plate towards the curved plate to clamp the curved plate to the wall of the auger tube, the fastener comprises two mounting bolts passing through the curved plate, each of the mounting bolts having a threaded portion that extends into the clamping plate and a head portion that adjoins the convex outer surface of the curved plate, the clamping plate is provided with two clip nuts into which the threaded portions of the mounting bolts are screwed, the clamping plate is also provided with a seating offset having an outer surface which engages the wall of the auger tube when the access plate is clamped thereto.

8. A harvesting platform as defined by claim 7 wherein the access plate and the access opening are oblong.

* * * * *